Feb. 16, 1965 J. RABINOW 3,170,139

MARKER FOR MACHINE READABLE DOCUMENTS

Filed Jan. 15, 1962 2 Sheets-Sheet 1

INVENTOR

Jacob Rabinow

BY Joseph A. Genovese & Max L. Libman

ATTORNEYS

INVENTOR.
Jacob Rabinow
BY Joseph A. Genovese &
Max L. Libman
ATTORNEYS 3,170,139

MARKER FOR MACHINE READABLE DOCUMENTS

Jacob Rabinow, Takoma Park, Md., assignor, by mesne assignments, to Control Data Corporation, Minneapolis, Minn., a corporation of Minnesota Filed Jan. 15, 1962, Ser. No. 166,166
15 Claims. (Cl. 340—146.3)

This invention relates to reading machines and particularly to the marking of documents having a portion or portions of reading material which, for one reason or another, are incapable of being identified by the reading machine.

As used herein the term "character" means any letter, numeral, symbol, pattern, word, or portion or group thereof formed by any means such as by hand, typewriter, printing, etc., capable of beind identified by machine. The term "document" is used in a general sense to include sheets, pages, labels, cards, prints, etc. The word "marker" is defined as any means for forming a discernible mark such as a printed impression, an engraving, a perforation, etc. The term "reject" means a machine-failure to identify a character regardless of the reason for the failure, such as the character being mutilated, poorly printed, etc.

One of the basic advantages of reading machines is the tremendous speed at which they can operate. For instance, when used as an input device to a computer, the computer can be fed at its intake-design speed, which is not ordinarily possible with the more common, earlier methods of feeding data to a computer. Consequently, the documents themselves are handled at a very high rate, and in a short time a large stack, quantity, etc. of processed documents are accumulated.

In reading a document by machine there is an occasional reject, and the machine operator should be able to quickly and easily ascertain which character in the usually large accumulation of documents was responsible for the reject. An object of this invention is to provide means for simplifying the detection of the document, and/or fragment thereof which has the character responsible for the reject.

If a reading machine is used "on line" as a direct or substantially direct input device for a computer, the reject signal which most reading machines are equipped to provide may be used to insert an "ignore" symbol into the computer in place of the rejected character. When used "off-line," for instance, to form a buffer-record, the reject signal may be used in the same way. However, when the reading machine is used off-line, a machine operator often has the opportunity to edit the record before it is fed to the computer.

When editing the record or when editing the results of the computer operation, it is necessary for a human machine operator to examine the document containing the character responsible for the reject and correct the record by manual means after the operator has ascertained the identity of the rejected character. It is now evident that since the reading machine is capable of handling tremendous quantities of documents at high speed and, at best, the machine operator will have only a vague idea of where to begin looking for the "reject," discovery of the character responsible for the reject will be very difficult and time-consuming, and sometimes impossible. The search becomes impossible when all of the characters appear to be printed well, and perhaps two characters barely touch so that, to the machine, the two characters appear as a single character. In other instances, all or many of the characters may be poorly printed so that the machine operates marginally for many characters, and the machine operator would have to use his discretion in selecting which of the poorly printed characters is printed more poorly than the others. Of course, by making a comparison of the buffer and many of the documents which correspond to the general buffer area containing the reject, the operator could, by elimination, determine what is the identity of the character that caused the reject. Here again, this would be an arduous task. Certainly, it would reduce the over-all usefulness and effectiveness of the reading machine.

This invention overcomes the above difficulties by forming a mark on the document which has the character responsible for a reading machine reject. The mark is placed in a position enabling a human operator to very easily determine the precise part of the single document having the above-mentioned character.

In one embodiment of the invention the mark is made adjacent to the character. Sometimes it is not practical to mark the document near the rejected character because the machine user will not permit this, or because the machine is so fast that the response time for an ordinary marker would be too slow. An example of such a machine is a page reading machine where the documents are in a form of printed or typewritten pages having the print formed in lines. Application Serial No. 32,911, now U.S. Patent No. 3,104,369 of Rabinow et al. discloses such a machine.

Accordingly, another form of the invention has means to apply a mark to identify the line of a document containing a character which the machine is incapable of identifying. Even if the line of a document is identified, a machine constructed like that disclosed in the above copending application, handled so many pages per minute that in a very short time the accumulation of read pages is very large. Specifically, that machine identified the characters on about 800 pages every hour. If it is assumed that there is an average of one or two rejects each hour, this would mean that the machine operator would have 800 pages every hour to look through. It is obviously impossible to closely examine the print on 800 pages in an hour to attempt to locate a defective character. It is still quite difficult to individually handle 800 pages in an hour if the mark is located anywhere on the page. Accordingly, another object of the invention is to provide a mark at a predetermined place on only those pages which have a reject somewhere on their area. A very convenient place for the page-mark is at one corner so that the machine operator can periodically riffle through an entire stack of pages by simply peeling one corner back with his thumb while looking for the page-mark.

Although the word "page" is used above, it is understood that the mark near the corner (or near a predetermined edge) could be applied to any flexible sheet whether or not it is technically a "page."

Other objects and features will become apparent in following the description of the illustrated forms of the invention.

Figure 3:
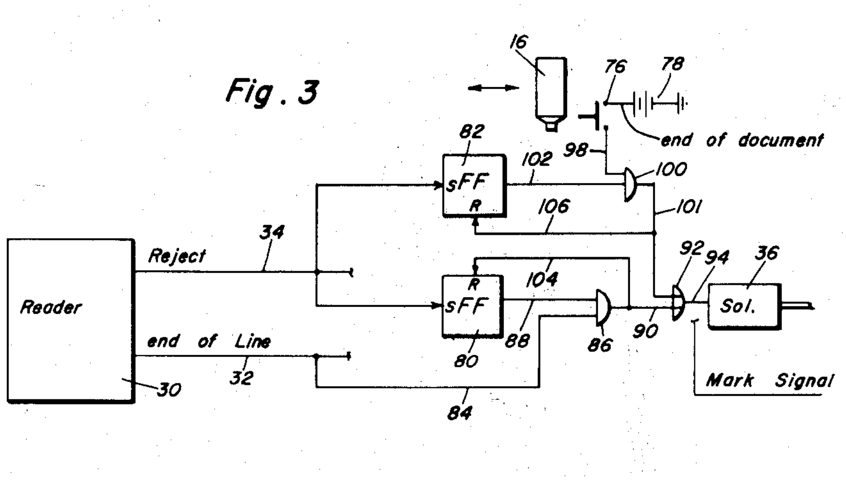
FIGURE 3 is a logic diagram showing a circuit for operating the marker.
Figure 3A:
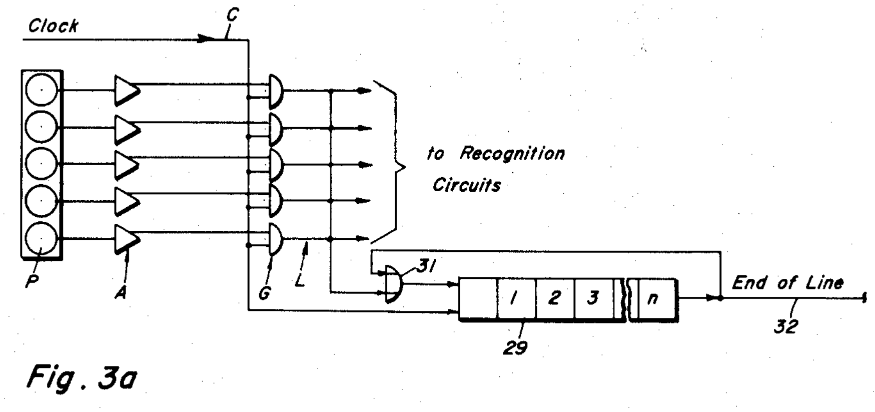

FIGURE 3*a* is a logic diagram showing one way to provide an "end of line" signal.

Figures 1, 2, 4:
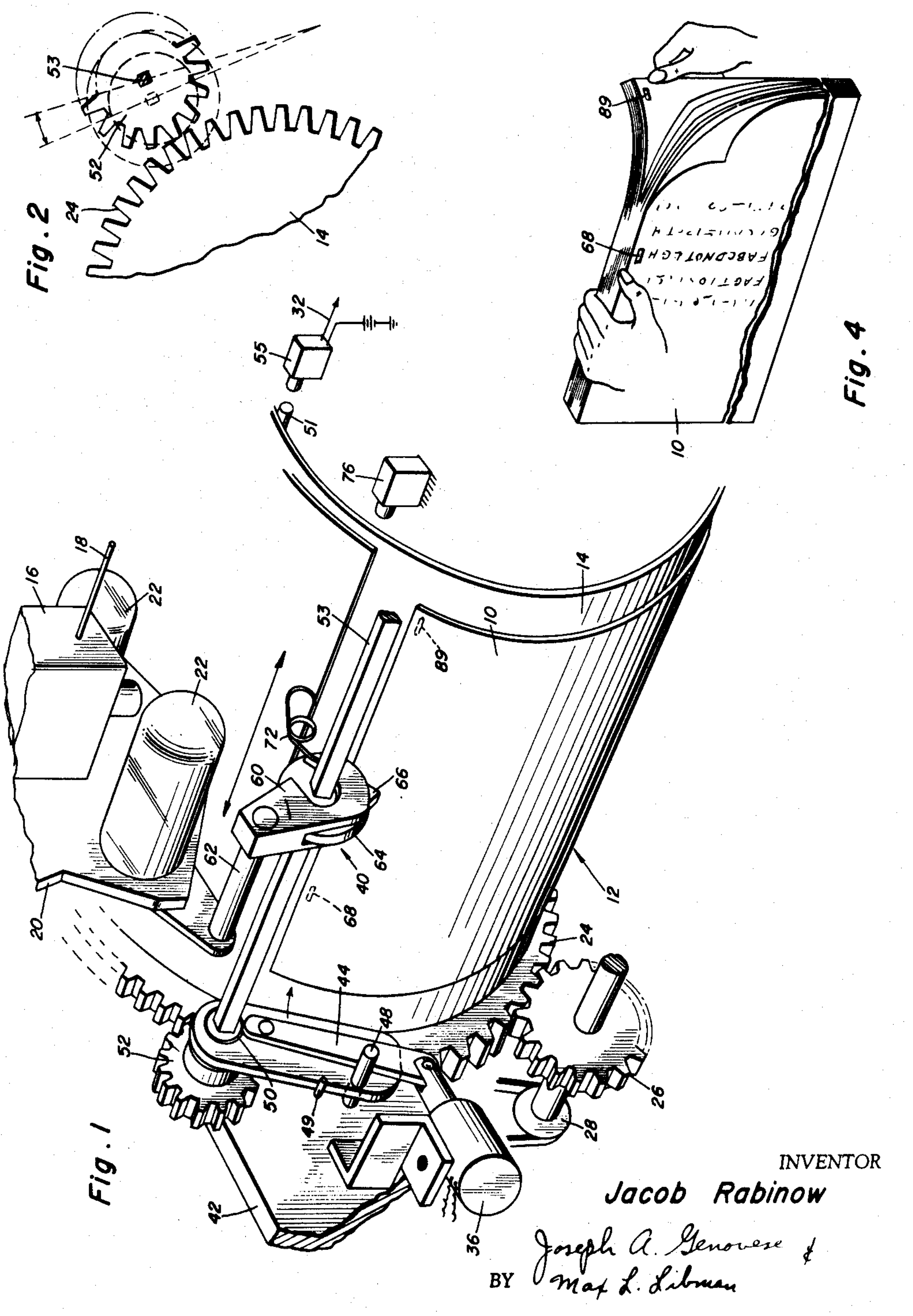
FIGURE 1 is a fragmentary perspective view showing a document transport, the examination device of a reading machine, and a marking device to form a mark on the document to indicate which line on the document has a character responsible for a reject signal and also to provide a mark on the document on a predetermined place to identify the document as one containing a rejected character.
FIGURE 2 is a diagrammatic fragmentary elevational view showing a portion of the means to drive the marker.

FIGURE 4 is a perspective view showing how a large group of documents may be riffled for an easy determination of which documents contain characters responsible for the reject signals.

Figure 5:
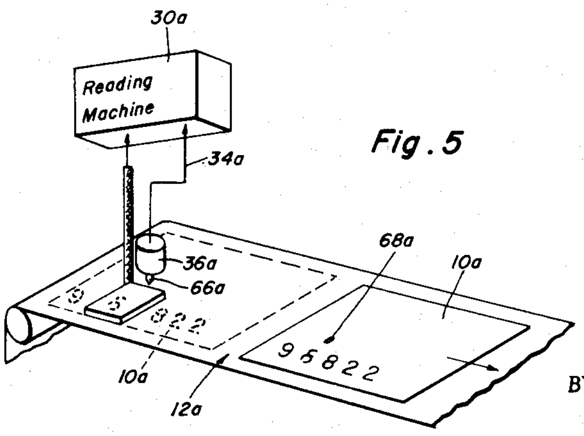

FIGURE 5 is a diagrammatic perspective view showing a modification of the invention.

In accompanying drawings attention is first directed to FIGURES 1–4. These figures show a form of the invention where the documents 10 are flexible sheets having parallel lines of print thereon and moved by a document transport 12. For the purpose of explanation, it is assumed that the document transport 12 is the same as disclosed in pending application Serial No. 72,697 of W. Fischer entitled Spiral Page Moving Machine, filed on November 30, 1960. As disclosed in that application, the document transport has a rotary drum 14 on whose surface successive documents 10 are so attached that the end of the first line of a document is aligned with the beginning of the second line of the same document; the end of the second line is aligned with the beginning of the third line, etc. In this way the individual lines of print appear as a single helical line. This is accomplished by skewing the document slightly on the drum. The same pending application discloses and/or has reference to a character examination device 16 constrained to move parallel to the axis of the drum near its surface. Means 18 (diagrammatically shown herein) consists of a tape or an equivalent drive to move the examination device 16, its supporting carriage 20 and lamps 22, at a speed sufficient to keep examination device 16 in optical alignment with the continuous helical line of print on document 10. This subject matter, and the means to rotate the drum, are disclosed in the copending application. As shown therein, the drum 14 has a gear 24 at one end which is enmeshed with the drive pinion 26, the latter being rotated by any suitable means such as belt and pulley 28.

Several control signals are required for the invention. They are briefly mentioned below and discussed in detail later. Reject signals (line 34 FIGURE 3) are provided by a number of reading machines, for example Serial Number 90,724 filed on February 21, 1961, by J. Rabinow and W. Fischer, and Serial Number 32,911 by Rabinow et al. "End of document" signals can be produced (line 98, FIGURE 3) by operating switch 76 (FIGURE 1) or by other means. "End of line" signals (line 32, FIGURE 3) can be produced by operating switch 55 (FIGURE 1) each drum revolution, or by one or more photocells (not shown) looking for the space between adjacent edges of the document on the drum, or by a logic circuit as in FIGURE 3*a*. This view shows a scanner made of a vertical row of photocells P across which the image of a character horizontally moves (just as in application Serial Number 32,911). The photocell outputs are amplified at A to form respective inputs to AND gates G whose only other input is a clock pulse on clock line C. The gate outputs are conducted on lines L to the recognition circuits of the reading machine for character recognition.

For simplicity, it is assumed that when a photocell "sees" a part of a character, there will be a +6 volt signal on its associated line L at the time of clock C. Also, when a photocell sees a part of the character background, there will be no signal (0 volts) on its line L at the clock time. Thus, by operating a ring counter 29 by the clock signals C and by resetting the counter every time there is a +6 volt signal on any of the lines L, we can detect the long white space at the beginning or end (or both) of every individual line of characters making up the helix (or individual lines even when they are not arranged to form a helix). Specifically if we assume that the characters of a word are spaced two or three scans (successive clock pulses as the document moves horizontally) we would want the counter 29 to have more stages than this number. If the spacing between words is about eight or ten scans, the counter should have a greater number of stages, say fifteen or twenty. Thus, in the example under consideration, the "*n*th" stage of the counter can be the twentieth.

Since the counter 29 is reset each time there is a +6 volt (black) signal on any line L (through OR gate 31), we know that when the counter steps to its end, the end of the line has been reached. At that time an "end of line" signal occurs on line 32 which is fed back to the OR gate 31 to reset the counter 29 and thereby prepare it for the next line.

Attention is directed to FIGURE 3 showing a reading machine 30 having an output line 32 which conducts a signal indicating "end of line." This signal can be obtained as explained above (FIGURE 3*a*) or by having projection 51 on drum 14 operate switch 55 each drum revolution. Line 34 conducts a signal indicating a reject, and switch 76 (top of FIGURE 3) controls a circuit 78 (described later) whole output on line 98 signals "end of document." Although the details of the circuit in FIGURE 3 are described later, the function of the circuit is as follows: if there is a reject while a line of print is being read, solenoid 36 or the equivalent, is actutated at the end of the line containing the rejected character. Each time the solenoid 36 is actuated (described in detail later) a mark is formed on the document being read. In addition, when the examination device 16 has completed its examination of the document, the solenoid 36 is again actuated provided that, and only provided that, there has been at least one reject in identifying the characters of the document in the reading station of document transport 12.

Returning now to FIGURE 1, the marker or marking device 40 and the means for mounting and operating it are described. Transport 12 has a frame, a portion 42 of which is shown at the left side of FIGURE 1. Solenoid 36 is mounted by means of a suitable bracket attached to the frame, and a lever 44 is pivoted to the armature of the solenoid. Arm 46 is mounted on a pivot pin 48 which is attached to the frame 42, and there is a bearing 50 pressed or otherwise attached in an opening in the arm 46. A square shaft 53 (or the equivalent) is supported near one end in bearing 50 and at the other end by a bearing and bracket structure (not shown). Pinion 54 is attached to the shaft 53 and is enmeshed with the teeth of gear 24 (see FIGURE 2). When in normal operating position (shown in full lines in FIGURE 2) the teeth of gears 52 and 24 are enmeshed so that shaft 53 is rotated in synchronism with the rotation of drum 14. When solenoid 36 is actuated, the armature pulls inward thereby rocking the lever 44 about a fulcrum established by pin 48. The rocking movement of the lever 44 rotates the arm 46 through a small arc (FIGURE 2) in a direction to move the teeth of pinion 52 deeper into the spaces between the teeth of gear 24. Thus, the shaft 53 is laterally displaced clockwise (as shown in FIGURE 1) thereby pivotally swinging holder 60 which is pivoted on a spindle 62 attached to the carriage 20 of the examination device.

The holder 60 has an open-bottom pocket containing a rotary printing disc 64 preferably of the type containing its own ink supply. One or more fingers 66 projecting from the periphery of the disc make contact with the document 10 to form the mark, for instance mark 68 (FIGURE 4). Noncircular shaft 53 extends through an opening in the disc 64 so that the disc is continually rotated, but it is normally clear of the document so that it does not make an impression on the document until the solenoid 36 is actuated thereby swinging the holder 60 (as described) toward the document on drum 14 and allowing the finger 66 to touch the surface of the document. By having the disc 64 rotate in a direction opposite to the rotation of the drum 14 the relative surface speeds of the finger 64 and the document are maintained low (or zero) to prevent the mark 68 from being formed as a streak, even though a short streak instead of a well-defined mark 68 would be acceptable.

The cycling of the solenoid is very fast. By having the solenoid armature directly pivotally connected to the arm 46 (arrangement not shown) the solenoid spring contained within the solenoid may be used as the return for the arm 46, returning it to the stationary stop 49 attached to the frame 42. Another way to achieve this same result is to use a spring 72 attached to holder 60 and bearing against the document 10 on the drum 14 when the solenoid 36 is pulsed to bring gears 52 and 24 into deep engagement (dotted line position of FIGURE 2). Thus, the spring 72 provides the return force to restore the holder 60, shaft 53, arm 46, etc., to the normal operating position.

As mentioned previously, when the optical head 16 reached the end of its "read" cycle, an "end of document" signal can be provided by operating switch 76 whose actuator is in the path of movement of a part of the carriage 20 or some other convenient part, e.g. holder 60 as shown in FIGURE 1. If the switch 76 controls a source circuit 78 (or the equivalent) as shown in FIG. 3, there will be a signal each time that each document has been examined. This signal is used to operate the same solenoid 36 (although an additional solenoid should be used) provided that there has been a reject in the reading of the document in the reading station. This has been referred to before and is accomplished as shown in FIGURE 3. When there is a reject signal on line 34 from the reading machine, it is used to set two flip flops 80 and 82 respectively. When there is an "end of line" signal on line 32, for instance as shown in FIGURE 3*a*, the signal is conducted on line 84 which forms one input to a two-entry AND gate 86. The other entry is on line 88 which is the output of flip flop 80. Thus, flip flop 80 is a memory device to remember the reject signal. The gate 86 interrogates the flip flop 80 at the "end of line" signal, and if a reject has been stored in the flip flop (by setting the flip flop) gate 86 is satisfied thereby providing an output on line 90 which is OR gated at 92, and conducted on line 94 from the OR gate to the solenoid 36.

As indicated above, as soon as there is a reject signal on line 34, flip flop 82 is set concurrently with the setting of flip flop 80. However, flip flop 82 is not interrogated until the end of the entire document, i.e. when switch 76 is closed. When switch 76 is closed there is a signal on line 98 and this is applied as one input to an AND gate 100. The other input is line 102, that is, the output line from flip flop 82. Thus, if there has been a reject on the entire document, and only if there has been a reject there will be an output on line 101 from gate 100 which is OR gated at 92 and passed to the solenoid 36. The flips flops are reset suitably. For example, the flip flop 80 which must be reset at the end of each line, is reset by a signal fed back over line 104 from line 90. The flip flop 82 which must be reset at the end of each document, is reset by a signal on feedback line 106 attached to line 100 and to the reset terminal of the flip flop 82. With documents marked at the beginning or end (depending on the direction of reading) of the lines containing rejected characters and also marked at a predetermined place, for instance as at 89 in one corner (FIGURE 4), it is comparatively simple to periodically pick up a group of documents and riffle through them (FIGURE 4) to pick out those documents which contain rejected characters. If it is desirable to retain the documents in the order of reading, the machine operator can be instructed to preserve this order.

Attention is now directed to FIGURE 5 showing a modification of the invention. The previously described embodiment is particularly concerned with documents in the form of pages. A considerable quantity of reading by machine does not use pages, but uses cards, checks, etc. Much reading is on a single line basis or simply a few lines in comparison to the larger number of lines on a typewritten or printed page. Furthermore, transports for documents vary considerably. Therefore, transport **12*a* is shown as a flat conveyor supporting documents 10*a* moving horizontally. The reading machine 30*a* has a full mosaic examination device, for example, as shown in the J. Rabinow pending application Serial No. 115,267 entitled Non-Scanning Character Reading Machine. In this form of the invention the reject signal on line 34*a* is used to operate a solenoid 36*a* whose armature has a marking finger 66*a*. Thus when document 10*a* is in the dotted line position and a reject signal occurs, it operates solenoid 36*a* to print mark 68*a*** near the rejected character.

It is understood that if an additional mark corresponding to mark 89 of FIGURE 4 is desired on documents **10*a*, circuits similar to those of FIGURE 3 could be used. However, where the documents contain only a small number of characters, marks 68*a*** will usually be sufficient.

Although only two forms of the invention are shown and various modifications in addition thereto described, it is understood that these are given by way of example only and that all modifications falling within the scope of the following claims may be resorted to.

I claim:

1. In an optical reading machine for identifying printed characters on documents, where the machine has means providing a signal which indicates a machine-rejection of a character; marking means, and means responsive to said signal-providing-means for actuating said marking means to form a record of said rejection on the document containing the rejected character.

2. The reading machine of claim 1 wherein said marking means include a printer.

3. The reading machine of claim 2 wherein the documents contain alpha numeric characters arranged in lines, and means mounting said printer in a position so that said record mark is on the document containing the rejected character and adjacent to the line containing the rejected character.

4. The reading machine of claim 3 and means to provide an additional mark on each document having a rejected character, at a predetermined place to facilitate recovery of said each document from an intermixed group containing completely read and incompletely read documents.

5. In an optical reading machine having means to provide a signal indicating a failure to identify a portion of the reading material where the reading material is on a surface, and an apparatus to handle the reading material during reading thereof by the machine; means for marking said surface; and means responsive to said signal for operating said marking means.

6. The subject matter of claim 5 wherein said reading material is in lines, and said mark is applied to said surface at a position to indicate the line of said reading material containing the unidentified portion.

7. The subject matter of claim 6 wherein said reading material is in the form of sheets, and means also responsive to said signal to actuate said marking means to apply an additional mark on a predetermined part of each marked sheet to facilitate visual detection of the marked sheets in a group having both marked and unmarked sheets.

8. The subject matter of claim 5 wherein said marking means include a rotary printer, and means to synchronize the rotation of said printer with the operation of said reading material handling apparatus.

9. In an optical character reading machine having a transport for documents containing lines of characters, and where the reading machine has means providing a reject signal in response to a failure to identify one of the characters, said signal providing means being operative to provide a signal each time that there is a rejected character on a document, the improvement comprising a marker, said marker including a mark forming member, means for rotating said mark forming member in a direction relative to the movement of said documents such that the linear motion of said member and documents is in the same direction at the adjacent portions of each, and means responsive to each of said reject signals for displacing said member of said marker to bring said member into contact with the document containing the rejected character and thereby mark the document in a place corresponding to the general area of the document containing the rejected character.

10. In an optical character reading machine having a transport for documents containing lines of characters, and where the reading machine has means providing a reject signal in response to a failure to identify one of the characters said signal providing means being operative to provide a signal each time that there is a rejected character on a document, the improvement comprising a marker, said marker including a mark forming member, means for rotating said mark forming member in a direction opposite to the movement of said documents so that the linear motion of said member and documents is in the same direction at the adjacent portions of each, means responsive to each of said reject signals for displacing said member of said marker in a direction to bring said member into contact with the document while the document and member are moving, and thereby mark the document containing the rejected character in a place corresponding to the general area of the rejected character, and means for again actuating said marker to form an additional mark on those documents at a predetermined portion thereof, which have a rejected character to facilitate ascertaining which documents in a group thereof contain rejected characters.

11. The subject matter of claim 9 wherein said marker member is a self-contained printer.

12. In an optical character reading machine for characters arranged in lines on a document, said machine having means providing a signal when a character is rejected by the reading machine and also having means providing a signal at the ends of said lines, and marking means for said documents, means for combining said signals and providing an output to actuate said marking means so as to form a mark on the document in a position which identifies the line containing the rejected character.

13. The reading machine of claim 12 and means associated with said marking means for providing an additional mark to identify each document having a rejected character.

14. In an optical character reading machine for documents containing printed characters, wherein said machine has means to provide a reject signal in response to a machine-failure to identify a character, the improvement comprising a document marker, and means responsive to said signal to apply to a mark to the document, said mark being on and in addition to the printed characters of the machine-read document.

15. The subject matter of claim 14 wherein said characters are printed in lines, and the reading machine has means to provide an end-of-document signal, and signal combining means for said reject signals and said end-of-document signals to provide a new signal to initiate an additional marking of the machine-read document that has a rejected character.

References Cited by the Examiner

UNITED STATES PATENTS

| | | | |
|---|---|---|---|
| 2,059,805 | 11/36 | Page | 101—93 |
| 2,102,577 | 12/37 | Cleven | 101—93 |
| 2,328,638 | 9/43 | Fuller et al. | 101—96 |
| 2,353,327 | 7/44 | Warwick | 178—23 |
| 2,557,964 | 6/51 | Herbst | 178—23 |
| 2,581,961 | 1/52 | Lake | 178—23 |
| 2,682,573 | 6/54 | Hunt | 340—147 |
| 2,688,656 | 9/54 | Wright et al. | 178—23 |
| 2,799,221 | 7/57 | Olivetti | 101—93 |

MALCOLM A. MORRISON, *Primary Examiner.*

WILLIAM B. PENN, *Examiner.*

UNITED STATES PATENT OFFICE

CERTIFICATE OF CORRECTION

Patent No. 3,170,139 February 16, 1965

Jacob Rabinow

It is hereby certified that error appears in the above numbered patent requiring correction and that the said Letters Patent should read as corrected below.

Column 2, line 33, for "copending application" read -- patent --; column 3, lines 15 to 18, strike out "pending application Serial No. 72,697 of W. Fischer entitled Spiral Page Moving Machine, filed on November 30, 1960. As disclosed in that application" and insert instead -- Patent No. 3,069,494. As disclosed in that patent --; line 26, for "pending application" read -- patent --; line 36, for "copending application" read -- Patent No. 3,069,494 --; lines 44 to 46, for "Serial Number 90,724 filed on February 21, 1961, by J. Rabinow and W. Fischer, and Serial Number 32,911 by Rabinow et al." read -- as shown in FIGURE 3 of Patent No. 3,104,369 --; lines 55 and 56, for "(just as in application Serial Number 32,911)" read -- , eg. similar to Patent No. 3,104,369 --; same column 3, line 75, for "spaced two" read -- spaced distances corresponding to two --; column 6, lines 12 and 13, for "the J. Rabinow pending application Serial No. 115,267 entitled Non-Scanning Character Reading Machine" read Patent No. 2,682,043 --; same column 6, lines 62 and 63, for "reading material is in the form of" read -- surface is defined by a sheet and the reading material is formed on such --.

Signed and sealed this 3rd day of August 1965.

(SEAL)
Attest:

ERNEST W. SWIDER
Attesting Officer

EDWARD J. BRENNER
Commissioner of Patents